(12) United States Patent
E et al.

(10) Patent No.: US 12,115,619 B2
(45) Date of Patent: Oct. 15, 2024

(54) MAGNETIC GRINDING DEVICE AND MAGNETIC GRINDING CONTROL METHOD

(71) Applicant: ZHEJIANG NORMAL UNIVERSITY, Jinhua (CN)

(72) Inventors: Shiju E, Jinhua (CN); Xinsheng He, Jinhua (CN); Chunfu Gao, Jinhua (CN); Chongqiu Zhou, Jinhua (CN); Lanpeng Zheng, Jinhua (CN); Jiajie Jiang, Jinhua (CN); Huaiyi Zhang, Jinhua (CN); Huadong Wang, Jinhua (CN); Chengwu Wang, Jinhua (CN)

(73) Assignee: ZHEJIANG NORMAL UNIVERSITY, Jinhua (CN)

( * ) Notice: Subject to any disclaimer, the term of this patent is extended or adjusted under 35 U.S.C. 154(b) by 468 days.

(21) Appl. No.: 17/602,514

(22) PCT Filed: May 21, 2021

(86) PCT No.: PCT/CN2021/095135
§ 371 (c)(1),
(2) Date: Oct. 8, 2021

(87) PCT Pub. No.: WO2021/238792
PCT Pub. Date: Dec. 2, 2021

(65) Prior Publication Data
US 2022/0305609 A1    Sep. 29, 2022

(30) Foreign Application Priority Data

May 28, 2020 (CN) .......................... 202010466450.5

(51) Int. Cl.
*B24B 37/005* (2012.01)
*B23Q 3/154* (2006.01)

(52) U.S. Cl.
CPC .......... *B24B 37/005* (2013.01); *B23Q 3/1543* (2013.01); *B23Q 3/1546* (2013.01)

(58) Field of Classification Search
CPC .... B23Q 3/1543; B23Q 3/1546; B24B 1/005; B24B 7/075; B24B 7/248; B24B 13/06;
(Continued)

(56) References Cited

U.S. PATENT DOCUMENTS 4,603,509 A * 8/1986 Kunieda ................ B24B 35/00
451/28
10,710,207 B2 * 7/2020 Bukkapatnam ....... B24B 31/112
(Continued)

FOREIGN PATENT DOCUMENTS

| CN | 101352826 A | 1/2009 |
| CN | 102079066 A | 6/2011 |

(Continued)

OTHER PUBLICATIONS

International Search Report for PCT/CN2021/095135, mailed Jul. 26, 2021.

*Primary Examiner* — Edward F Landrum
*Assistant Examiner* — Sarah Akyaa Fordjour
(74) *Attorney, Agent, or Firm* — Pilloff Passino & Cosenza LLP; Rachel K. Pilloff; Sean A. Passino

(57) ABSTRACT

The present disclosure provides a magnetic grinding device and a magnetic grinding control method, and relates to the field of machining. According to the device, a magnet platform of a grinding piece fixing table is connected with an electromagnet; the grinding piece fixing table is used for fixing a to-be-ground workpiece; an output end of a programmable power supply is connected with a coil of the electromagnet; a permanent magnet grinding rod is located above the to-be-ground workpiece; and a magnetic grinding control system is connected with the programmable power
(Continued)

supply and is used for acquiring grinding points, on the to-be-ground workpiece, of the permanent magnet grinding rod, and controlling an output voltage of the programmable power supply by utilizing a removal amount of a blank workpiece surface shape of the to-be-ground workpiece, the grinding points and a pulse width modulation (PWM) control method.

9 Claims, 3 Drawing Sheets

(58) Field of Classification Search
CPC ... B24B 31/003; B24B 31/102; B24B 31/112; B24B 37/005; B24B 37/04; B24B 37/044; B24B 41/044; B24B 49/02; B24B 49/03; B24B 49/04; B24B 49/05; B24B 51/00
USPC ..... 451/9–11, 34, 35, 59, 74, 104, 113, 326, 451/327
See application file for complete search history.

(56) References Cited

U.S. PATENT DOCUMENTS

| | | | |
|---|---|---|---|
| 2003/0087585 A1* | 5/2003 | Kordonsky | B24B 37/04 451/5 |
| 2017/0043448 A1 | 2/2017 | Bukkapatnam et al. | |
| 2019/0270175 A1* | 9/2019 | Radnezhad | B24B 29/005 |

FOREIGN PATENT DOCUMENTS

| | | |
|---|---|---|
| CN | 104191318 A | 12/2014 |
| CN | 111482890 A | 8/2020 |
| JP | H1190813 A | 4/1999 |

* cited by examiner

MAGNETIC GRINDING DEVICE AND MAGNETIC GRINDING CONTROL METHOD

CROSS REFERENCE TO RELATED APPLICATION(S)

This application claims priority to Chinese Patent Application No. 202010466450.5, filed with China National Intellectual Property Administration (CNIPA) on May 28, 2020, and entitled "MAGNETIC GRINDING DEVICE AND MAGNETIC GRINDING CONTROL METHOD", which is incorporated herein by reference in its entirety.

TECHNICAL FIELD

The present disclosure relates to the field of machining, and in particular to a magnetic grinding device and a magnetic grinding control method.

BACKGROUND ART

As a new grinding method, magnetic grinding is a machining means for removing materials from the surface of a plane workpiece or a surface workpiece. It can change a shear stress and a yield stress of a grinding head by changing a size of a magnetic field. In addition, it does destroy a lower surface layer, and is thus widely used in superfinishing. Factors related to material removal includes a grinding pressure, a grinding speed, a grinding residence time, a grinding type, a grinding specification and a workpiece material. When the workpiece material, the grinding type and the grinding specification are consistent, the material removal can be changed by changing the grinding pressure, the grinding speed and the residence time.

A magnetic grinding pressure can be changed through changing a grinding clearance and a magnetic field intensity, and as the actual grinding is low in time slot, it is difficult to adjust the grinding clearance. Therefore, a present grinding method is to adjust the magnetic field intensity before grinding, and control the material removal amount through changing the grinding speed and the residence time during grinding. However, to-be-removed materials on the surface of the workpiece are distributed non-uniformly and require different removal amounts, and during continuous grinding, it is difficult to achieve smooth transition to obtain a smooth surface through only changing the grinding speed and the residence time in real time, resulting in low grinding precision. Therefore, the present grinding method has the problem of low grinding precision.

SUMMARY

The present disclosure aims to provide a magnetic grinding device and a magnetic grinding control method, to solve the problem of low grinding precision of the present grinding method.

To make the objectives, the present disclosure provides the following solutions:

a magnetic grinding device includes an electromagnet, a base, a grinding piece fixing table, a programmable power supply, a machine tool, a permanent magnet grinding rod and a magnetic grinding control system;
one end of the electromagnet is arranged on the base;
a magnet platform of the grinding piece fixing table is connected with the other end of the electromagnet; and the grinding piece fixing table is used for fixing a to-be-ground workpiece;
an output end of the programmable power supply is connected with a coil of the electromagnet; and the programmable power supply is used for supplying power for the electromagnet;
the permanent magnet grinding rod is arranged on the machine tool and located above the to-be-ground workpiece;
the machine tool is used for controlling the permanent magnet grinding rod to magnetically grind the surface of the to-be-ground workpiece;
and the magnetic grinding control system is connected with the programmable power supply and the machine tool, separately, and is used for acquiring grinding points, on the to-be-ground workpiece, of the permanent magnet grinding rod through the machine tool, and controlling an output voltage of the programmable power supply by utilizing a removal amount of a blank workpiece surface shape of the to-be-ground workpiece, the grinding points and a pulse width modulation (PWM) control method, so as to magnetically grind the to-be-ground workpiece.

Optionally, the grinding piece fixing table may specifically include: the magnet platform, a baffle and screws;
the magnetism of the magnet platform may be opposite to that of a grinding head of the permanent magnet grinding rod;
the baffle may be fixed on the magnet platform such that a container is formed by the grinding piece fixing table;
and the screws may run through the baffle and may be used for fixing the to-be-ground workpiece.

Optionally, the magnetic grinding device may further include a grinding medium;
and the grinding medium may cover the to-be-ground workpiece.

Optionally, the magnetic grinding control system may specifically include:
an acquisition module for acquiring the blank workpiece surface shape of the to-be-ground workpiece and a finished workpiece surface shape of the to-be-ground workpiece;
a removal amount determination module for determining a removal amount of each point on the surface of the to-be-ground workpiece by utilizing the blank workpiece surface shape and the finished workpiece surface shape;
a grinding pressure computation module for computing a grinding pressure of each point on the surface of the to-be-ground workpiece by utilizing the removal amount;
a magnetic field intensity computation module for computing a magnetic field intensity of each point on the surface of the to-be-ground workpiece by utilizing the grinding pressure;
an electromagnet voltage computation module for computing an electromagnet voltage of each point on the surface of the to-be-ground workpiece by utilizing the magnetic field intensity and turns of a coil of the electromagnet;
and a magnetic grinding module for controlling the output voltage of the programmable power supply by utilizing electromagnet voltages corresponding to the grinding points, on the to-be-ground workpiece, of the permanent magnet grinding rod and the pulse width modulation (PWM) method, so as to magnetically grind the to-be-ground workpiece.

A magnetic grinding control method is applied to the magnetic grinding device, and includes:

acquiring a blank workpiece surface shape of a to-be-ground workpiece and a finished workpiece surface shape of the to-be-ground workpiece;

determining a removal amount of each point on the surface of the to-be-ground workpiece by utilizing the blank workpiece surface shape and the finished workpiece surface shape;

computing a grinding pressure of each point on the surface of the to-be-ground workpiece by utilizing the removal amount;

computing a magnetic field intensity of each point on the surface of the to-be-ground workpiece by utilizing the grinding pressure;

computing an electromagnet voltage of each point on the surface of the to-be-ground workpiece by utilizing the magnetic field intensity and turns of a coil of an electromagnet;

and controlling an output voltage of a programmable power supply by utilizing electromagnet voltages corresponding to grinding points, on the to-be-ground workpiece, of a permanent magnet grinding rod and a pulse width modulation (PWM) control method, so as to magnetically grind the to-be-ground workpiece.

Optionally, the step of determining the removal amount of each point on the surface of the to-be-ground workpiece by utilizing the blank workpiece surface shape and the finished workpiece surface shape may specifically include:

establishing a Cartesian coordinate system by taking a projection point, on the surface of the to-be-ground workpiece, of a grinding head of the permanent magnet grinding rod as an origin 0, wherein a Z axis of the Cartesian coordinate system is parallel to the permanent magnet grinding rod, and an XOY plane formed by an X axis and a Y axis of the Cartesian coordinate system is parallel to the surface of the to-be-ground workpiece;

and comparing the blank workpiece surface shape with the finished workpiece surface shape, and determining a removal amount of each coordinate point on the surface of the to-be-ground workpiece by utilizing the Cartesian coordinate system.

Optionally, the step of computing the grinding pressure of each point on the surface of the to-be-ground workpiece by utilizing the removal amount may specifically include:

computing the grinding pressure of each point on the surface of the to-be-ground workpiece according to a formula $$P = \frac{\phi}{Kvt};$$

wherein p represents the grinding pressure; $\Phi$ represents the removal amount; K represents a constant coefficient; v represents a linear velocity of the grinding head; and t represents a grinding time.

Optionally, the step of computing the magnetic field intensity of each point on the surface of the to-be-ground workpiece by utilizing the grinding pressure may specifically include:

computing the magnetic field intensity of each point on the surface of the to-be-ground workpiece according to a formula P=K1H;

wherein P represents the grinding pressure; K1 represents a constant; and H represents the magnetic field intensity.

Optionally, the step of computing the electromagnet voltage of each point on the surface of the to-be-ground workpiece by utilizing the magnetic field intensity and the turns of the coil of the electromagnet may specifically include:

computing the electromagnet voltage of each point on the surface of the to-be-ground workpiece according to a formula $$E = \frac{H*Le*R}{N};$$

wherein E represents the electromagnet voltage; H represents the magnetic field intensity; Le represents an effective length of a magnetic path of the electromagnet; R represents the an impedance of the coil of the electromagnet; and N represents the turns of the coil of the electromagnet.

Optionally, before computing the grinding pressure of each point on the surface of the to-be-ground workpiece by utilizing the removal amount, the method may further include:

adjusting a grinding clearance and a grinding speed.

Based on specific embodiments provided in the present disclosure, the present disclosure provides the following technical effects:

the present disclosure provides a magnetic grinding device and a magnetic grinding control method. The device includes an electromagnet, a base, a grinding piece fixing table, a programmable power supply, a machine tool, a permanent magnet grinding rod and a magnetic grinding control system; one end of the electromagnet is arranged on the base; a magnet platform of the grinding piece fixing table is connected with the other end of the electromagnet; the grinding piece fixing table is used for fixing a to-be-ground workpiece; an output end of the programmable power supply is connected with a coil of the electromagnet; the programmable power supply is used for supplying power for the electromagnet; the permanent magnet grinding rod is arranged on the machine tool and located above the to-be-ground workpiece; the machine tool is used for controlling the permanent magnet grinding rod to magnetically grind the surface of the to-be-ground workpiece; and the magnetic grinding control system is connected with the programmable power supply and the machine tool, separately, and is used for acquiring grinding points, on the to-be-ground workpiece, of the permanent magnet grinding rod, and controlling an output voltage of the programmable power supply by utilizing a removal amount of a blank workpiece surface shape of the to-be-ground workpiece, the grinding points and a PWM method, so as to magnetically grind the to-be-ground workpiece. Through the removal amount of the blank workpiece surface shape, the grinding points and the PWM method, the output voltage of the programmable power supply is adjusted to adjust the magnetic field intensity of the electromagnet; through changing the magnetic field intensity in real time and fixing the grinding speed and the residence time of the permanent magnet grinding rod, the grinding precision is greatly improved, the process complexity is reduced, and convenience and reliability are provided; and by adoption of the permanent magnet grinding rod and a direct current electromagnet, double magnetic fields are provided to increase the magnetic field intensity. Therefore, the magnetic grinding device is suitable for magnetic grinding of surface shapes of plane workpieces and free surface workpieces.

BRIEF DESCRIPTION OF THE DRAWINGS

To describe the technical solutions in the embodiments of the present disclosure or in the prior art more clearly, the accompanying drawings required for the embodiments are briefly described below. Apparently, the accompanying drawings in the following description show merely some embodiments of the present disclosure, and a person of ordinary skill in the art may still derive other accompanying drawings from these accompanying drawings without creative efforts.

Symbol description: 1 represents a permanent magnet grinding rod; 2 represents a magnetic grinding head; 3 represents magnetic grinding powder; 4 represents a baffle; 5 represents screws; 6 represents a to-be-ground workpiece; 7, represents a plate pole; 8 represents a direct current electromagnet; 9 represents a base; 10 represents a pointed cone-shaped grinding head; 11 represents a five-axis machine tool; 12 represents a pulse width modulation (PWM) direct current power supply; and 13 represents a controller.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The present disclosure aims to provide a magnetic grinding device and a magnetic grinding control method, to solve the problem of low grinding precision of the present grinding method.

To make the above-mentioned objectives, features, and advantages of the present disclosure clearer and more comprehensible, the present disclosure will be further described in detail below with reference to the accompanying drawings and the specific implementation.

Figure 1:
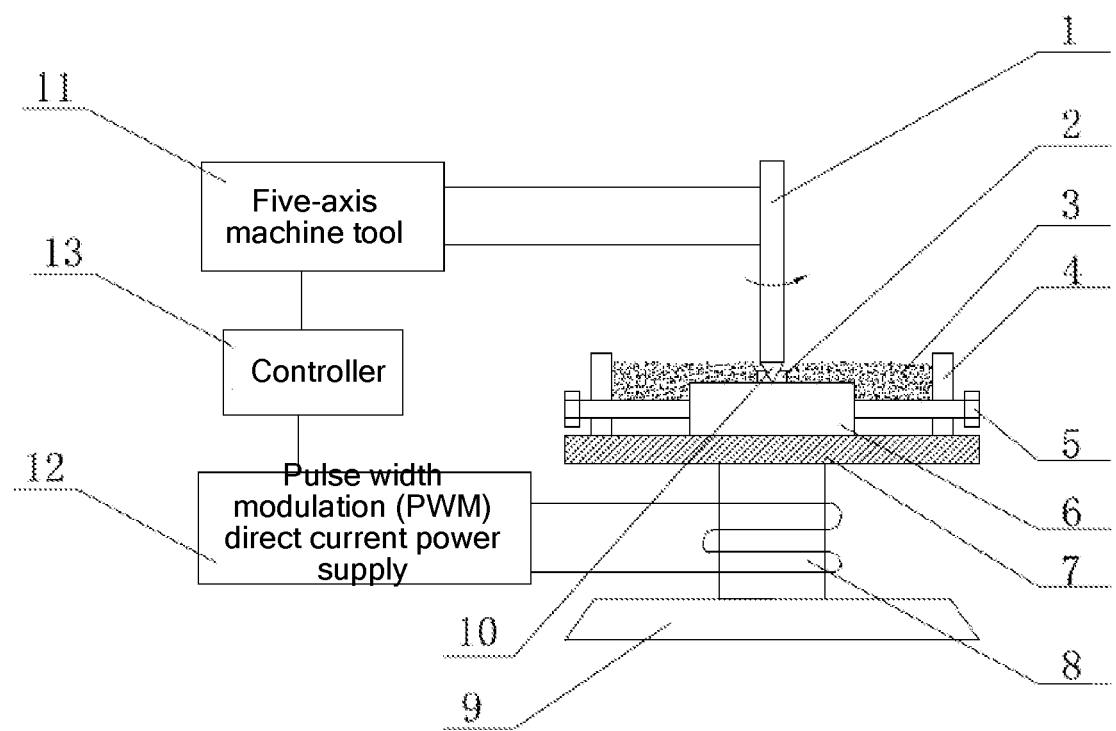
FIG. 1 is a structural diagram of a magnetic grinding device of an embodiment of the present disclosure.

The embodiment provides a magnetic grinding device, and FIG. 1 is a structural diagram of the magnetic grinding device of the embodiment of the present disclosure. Refer to FIG. 1, the magnetic grinding device includes an electromagnet, a base 9, a grinding piece fixing table, a programmable power supply, a machine tool, a permanent magnet grinding rod 1, a magnetic grinding control system and a grinding medium.

One end of the electromagnet is arranged on the base 9. The electromagnet adopts a direct current electromagnet 8. The direct current electromagnet 8 is used for generating magnetic fields.

A magnet platform of the grinding piece fixing table is connected with the other end of the electromagnet; and the grinding piece fixing table is used for fixing a to-be-ground workpiece 6. The magnet platform is used for gathering the magnetic fields generated by the direct current electromagnet 8 and distributing the magnetic fields uniformly. The to-be-ground workpiece includes a plane workpiece and a free surface workpiece.

The grinding piece fixing table may specifically include: the magnet platform, a baffle 4 and screws 5.

The magnetism of the magnet platform may be opposite to that of a grinding head of the permanent magnet grinding rod 1. The magnet platform may be a plate pole 7, and the other end of the electromagnet may be fixedly connected with the plate pole 7. The direct current electromagnet 8 may form the magnetic fields after electrification, and the plate pole 7 may gather the magnetic fields on the upper surface of the plate pole 7 and distribute the magnetic fields uniformly. The magnetism of the grinding head of the permanent magnet grinding rod 1 may be opposite to that of the plate pole 7.

The baffle 4 may be fixed on the magnet platform such that a container is formed by the grinding piece fixing table. The baffle 4 may include a plurality of sub-baffles which are connected in sequence to form a closed polygon; the polygon formed by connecting the plurality of sub-baffles may be fixed on the magnet platform through welding; and preferably, the polygon formed by connecting the plurality of sub-baffles may be quadrangles, such as squares or rectangles.

The screws 5 may run through the baffle 4 and may be used for fixing the to-be-ground workpiece 6.

An output end of the programmable power supply may be connected with a coil of the electromagnet. The programmable power supply may be a programmable direct current power supply, preferably, a PWM direct current power supply 12; an anode of the PWM direct current power supply 12 may be connected with an anode of the coil of the direct current electromagnet 8; and a cathode of the PWM direct current power supply 12 may be connected with a cathode of the coil of the direct current electromagnet 8.

The permanent magnet grinding rod 1 may be arranged on the machine tool and located above the to-be-ground workpiece 6. The permanent magnet grinding rod 1 may be vertical to the surface of the to-be-ground workpiece 6. The grinding head may be pointed cone-shaped. A clearance between the grinding head of the permanent grinding rod 1 and the surface of the to-be-ground workpiece 6 may be 1 millimeter (mm); and during grinding, the pointed cone-shaped grinding head 10 may adsorb magnetic grinding powder 3 to form a magnetic grinding head 2 so as to grind the surface of the to-be-ground workpiece. Therefore, a certain grinding clearance needs to be kept between the pointed cone-shaped grinding head and the surface of the to-be-ground workpiece, to prevent the permanent magnet grinding rod 1 from scratching the to-be-ground workpiece 6.

The machine tool may be used for controlling the permanent magnet grinding rod 1 to magnetically grind the surface of the to-be-ground workpiece 6. The machine tool may adopt a five-axis machine tool 11.

The magnetic grinding control system may be connected with the programmable power supply and the machine tool, separately, and may be used for acquiring grinding points, on the to-be-ground workpiece, of the permanent magnet grinding rod through the machine tool, and controlling an output voltage of the programmable power supply by utilizing a removal amount of a blank workpiece surface shape of the to-be-ground workpiece 6, the grinding points and a PWM control method, so as to magnetically grind the to-be-ground workpiece 6.

The grinding medium may cover the to-be-ground workpiece 6, and may be the magnetic grinding powder 3; and the magnetic grinding powder 3 may be placed in the grinding piece fixing table and cover the to-be-ground workpiece 6.

The to-be-ground workpiece 6 may be placed on a plate pole and fixed through rotating the screws 5 on the baffle 4; and the magnetic grinding powder 3 may be held in the grinding piece fixing table and cover the to-be-ground workpiece 6. Under joint action of the permanent magnet grinding rod 1 and the plate pole 7, the magnetic grinding head 2 may be formed around the pointed cone-shaped grinding head 10.

The magnetic grinding control system may specifically include:

an acquisition module for acquiring the blank workpiece surface shape of the to-be-ground workpiece and a finished workpiece surface shape of the to-be-ground workpiece;

and a removal amount determination module for determining a removal amount of each point on the surface of the to-be-ground workpiece by utilizing the blank workpiece surface shape and the finished workpiece surface shape;

the removal amount determination module specifically including:

a coordinate system establishment unit for establishing a Cartesian coordinate system by taking a projection point, on the surface of the to-be-ground workpiece, of the grinding head of the permanent magnet grinding rod as an origin 0, wherein a Z axis of the Cartesian coordinate system may be parallel to the permanent magnet grinding rod, and an XOY plane formed by an X axis and a Y axis of the Cartesian coordinate system may be parallel to the surface of the to-be-ground workpiece; and the Cartesian coordinate system of the embodiment may be a space Cartesian rectangular coordinate system which takes a direction far away from the XOY plane as a positive direction of the Z axis;

and a removal amount determination unit for comparing the blank workpiece surface shape with the finished workpiece surface shape, and determining the removal amount of each point on the surface of the to-be-ground workpiece by utilizing the Cartesian coordinate system.

The magnetic grinding control system may further include:

an adjustment module for adjusting a grinding clearance and a grinding speed, wherein the grinding speed may be a rotational angular velocity of a grinding shaft motor;

a grinding pressure computation module for computing a grinding pressure of each point on the surface of the to-be-ground workpiece by utilizing the removal amount, and specifically for computing a grinding pressure of a corresponding coordinate point by utilizing the removal amount of each coordinate point on the surface of the to-be-ground workpiece;

the grinding pressure computation module specifically including:

a grinding pressure computation unit for computing the grinding pressure of each point on the surface of the to-be-ground workpiece according to a formula (1), and specifically for computing the grinding pressure of the corresponding coordinate point by utilizing the removal amount of the coordinate point according to the formula (1), $$P = \frac{\phi}{Kvt} \quad (1)$$

wherein p represents the grinding pressure; Φ represents the removal amount of the coordinate point; K represents a constant coefficient; v represents a linear velocity of the grinding rod, with a unit of m/min; and t represents a grinding time;

a magnetic field intensity computation module for computing a magnetic field intensity of each point on the surface of the to-be-ground workpiece by utilizing the grinding pressure, and specifically for computing a magnetic field intensity of the corresponding coordinate point by utilizing the grinding pressure of each coordinate point on the surface of the to-be-ground workpiece;

the magnetic field intensity computation module specifically including:

a magnetic field intensity computation unit for computing the magnetic field intensity of each point on the surface of the to-be-ground workpiece according to a formula (2), and specifically for computing the magnetic field intensity of the coordinate point by utilizing the grinding pressure of the coordinate point according to the formula (2), $$P = K1H \quad (2)$$

wherein P represents the grinding pressure; K1 represents a constant; H represents the magnetic field intensity; and the grinding pressure may be in direct proportion to the magnetic field intensity H;

an electromagnet voltage computation module for computing an electromagnet voltage of each point on the surface of the to-be-ground workpiece by utilizing the magnetic field intensity and turns of the coil of the electromagnet, and specifically for computing an electromagnet voltage of the corresponding coordinate point by utilizing the magnetic field intensity of each coordinate point on the surface of the to-be-ground workpiece and the turns of the coil of the electromagnet;

the electromagnet voltage computation module specifically including:

an electromagnet voltage computation unit for computing the electromagnet voltage of each point on the surface of the to-be-ground workpiece according to a formula (3), and specifically for computing the electromagnet voltage of the coordinate points by utilizing the magnetic field intensity of the coordinate points and the turns of the coil of the electromagnet according to the formula (3), $$E = \frac{H*Le*R}{N} \quad (3)$$

wherein E represents the electromagnet voltage; H represents the magnetic field intensity; Le represents an effective length of a magnetic path of the electromagnet; R represents the an impedance of the coil of the electromagnet; and N represents the turns of the coil of the electromagnet;

and a magnetic grinding module for controlling an output voltage of the programmable power supply by utilizing electromagnet voltages corresponding to the grinding points, on the to-be-ground workpiece, of the permanent magnet grinding rod and the PWM method, so as to magnetically grind the to-be-ground workpiece, wherein a direct current voltage output, by the programmable direct current power supply, at each coordinate point on the surface of the to-be-ground workpiece may be adjusted by using the PWM control method (PWM technology) according to the electromagnet voltage of each coordinate point, and the direct current voltage output by the programmable direct current power supply may be equal to the voltage of the electromagnet.

In practical use, the magnetic grinding control system may be realized through a controller 13. The magnetic grinding control system may acquire the grinding points, on the to-be-ground workpiece, of the permanent magnet grinding rod through the machine tool, may control the output voltage of the programmable power supply according to electromagnet voltages corresponding to the grinding points and the PWM control method such that the electromagnet may generate corresponding magnetic field intensity to magnetically grind the to-be-ground workpiece, may acquire or plan a tool track of the grinding head so as to control the machine tool to move the permanent magnet grinding rod according to the tool track of the grinding head, and may control the output voltage of the programmable power supply according to the electromagnet voltages corresponding to the grinding points moved by the permanent magnet grinding method and the PWM control method such that the electromagnet may generate corresponding magnetic field intensity to magnetically grind the to-be-ground workpiece.

The electromagnet of the magnetic grinding device may form magnetic fields after electrification; the output voltage of the programmable power supply may be adjusted through the removal amount of the blank workpiece surface shape, the grinding points and the PWM method, so as to adjust the magnetic field intensity generated by the electromagnet; and through changing the magnetic field intensity in real time and fixing the grinding speed and the residence time of the permanent magnet grinding rod, the grinding precision may be greatly improved, the process complexity may be reduced, and convenience and reliability may be provided. Therefore, the magnetic grinding device may be suitable for grinding of surface shapes of plane workpieces and free surface workpieces, and wide in use. The electromagnet and the permanent magnet grinding rod may provide double magnetic fields to increase the magnetic field intensity.

Figure 2:
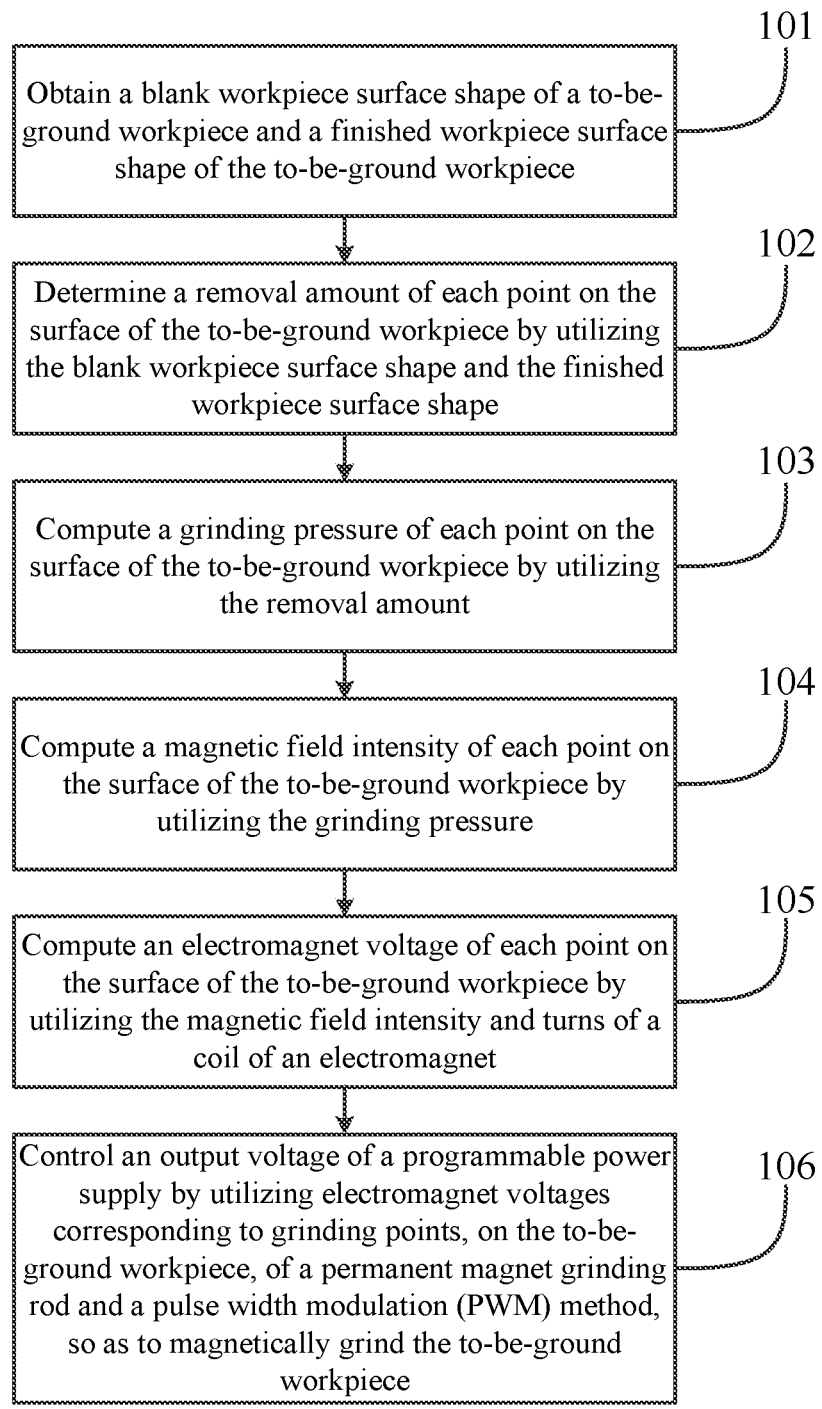
FIG. 2 is a flow diagram of a magnetic grinding control method of the embodiment of the present disclosure.

The embodiment further provides a magnetic grinding control method applied to the magnetic grinding device. An executive subject of the magnetic grinding control method is a magnetic grinding system, and FIG. 2 is a flow diagram of the magnetic grinding control method of the embodiment of the present disclosure. Refer to FIG. 2, The magnetic grinding control method includes:

step 101, acquire a blank workpiece surface shape of a to-be-ground workpiece and a finished workpiece shape of the to-be-ground workpiece;

step 102, determine a removal amount of each point on the surface of the to-be-ground workpiece by utilizing the blank workpiece surface shape and the finished workpiece surface shape;

the step 102 specifically including:

establish a Cartesian coordinate system by taking a projection point, on the surface of the to-be-ground workpiece, of a grinding head of a permanent magnet grinding rod as an origin 0, wherein a Z axis of the Cartesian coordinate system is parallel to the permanent magnet grinding rod, and an XOY plane formed by an X axis and a Y axis of the Cartesian coordinate system is parallel to the surface of the to-be-ground workpiece;

and compare the blank workpiece surface shape with the finished workpiece surface shape, and determine a removal amount of each coordinate point on the surface of the to-be-ground workpiece by utilizing the Cartesian coordinate system;

before step 103, the method further including: adjust a grinding clearance and a grinding speed, wherein the grinding speed is a rotational angular velocity of a grinding shaft motor;

step 103, compute a grinding pressure of each point on the surface of the to-be-ground workpiece by utilizing the removal amount, and compute a grinding pressure of a corresponding coordinate point by utilizing the removal amount of each coordinate point on the surface of the to-be-ground workpiece;

the step 103 specifically including:

compute the grinding pressure of each point on the surface of the to-be-ground workpiece according to a formula (1), and compute the grinding pressure of the coordinate point by utilizing the removal amount of the coordinate point according to the formula (1), $$P = \frac{\phi}{Kvt} \quad (1)$$

wherein p represents the grinding pressure; Φ represents the removal amount of the coordinate point; K represents a constant coefficient; v represents a linear velocity of a grinding head, with a unit of m/min; and t represents a grinding time;

step 104, compute a magnetic field intensity of each point on the surface of the to-be-ground workpiece by utilizing the grinding pressure, and compute a magnetic field intensity of the corresponding coordinate point by utilizing the grinding pressure of each coordinate point on the surface of the to-be-ground workpiece;

the step 104 specifically including:

compute the magnetic field intensity of each point on the surface of the to-be-ground workpiece according to a formula (2), and compute the magnetic field intensity of the coordinate point by utilizing the grinding pressure of the coordinate point according to the formula (2), $$P = K1H \quad (2)$$

wherein P represents the grinding pressure; K1 represents a constant; H represents the magnetic field intensity; and the grinding pressure is in direct proportion to the magnetic field intensity H;

step 105, compute an electromagnet voltage of each point on the to-be-ground workpiece by utilizing the magnetic field intensity and turns of a coil of an electromagnet, and compute the electromagnet voltage of the corresponding coordinate point by utilizing the magnetic field intensity of each coordinate point on the surface of the to-be-ground workpiece and the turns of the coil of the electromagnet;

the step 105 specifically including:
compute the electromagnet voltage of each point on the surface of the to-be-ground workpiece according to a formula (3), and compute the electromagnet voltage of the coordinate point by utilizing the magnetic field intensity of the coordinate point and the turns of the coil of the electromagnet according to the formula (3), $$E = \frac{H * Le * R}{N} \quad (3)$$

wherein E represents the electromagnet voltage; H represents the magnetic field intensity; Le represents an effective length of a magnetic path of the electromagnet; R represents the an impedance of the coil of the electromagnet; and N represents the turns of the coil of the electromagnet;

and step 106, control an output voltage of a programmable power supply by utilizing electromagnet voltages corresponding to grinding points, on the to-be-ground workpiece, of the permanent magnet grinding rod and a PWM control method, so as to magnetically grind the to-be-ground workpiece, wherein a direct current voltage output, by the programmable direct current power supply, at each coordinate point on the surface of the to-be-ground workpiece is adjusted by using the PWM control method (PWM technology) according to the electromagnet voltage of each coordinate point, and the direct current voltage output by the programmable direct current power supply is equal to the voltage of the electromagnet;

the step 106 specifically including: start a five-axis machine tool to acquire the grinding points, at the blank workpiece surface shape, of the current permanent magnet grinding rod and electromagnet voltages of the grinding points; control an output voltage, at the grinding points, of the programmable power supply by utilizing the electromagnet voltages of the grinding points and the PWM control method such that the electromagnet is electrified to form a magnetic field; and adsorb, by the grinding points, magnetic grinding powder to form a magnetic grinding head so as to grind the surface of the to-be-ground workpiece.

According to the magnetic grinding control method, removal amounts of all the coordinate points on the surface of the to-be-ground workpiece may be firstly computed by utilizing the blank workpiece surface shape and the finished workpiece surface shape of the to-be-ground workpiece; the electromagnet voltage of each coordinate point may be then computed by utilizing the removal amounts of the coordinate points, and the electromagnet voltages of all the coordinate points may be stored; and the electromagnet voltages of stored coordinate points corresponding to the grinding points may be finally acquired according to specific grinding points during grinding, and a direct current voltage output by a programmable direct current power supply may be adjusted by utilizing the electromagnet voltages of the grinding points and the PWM control method, such that the electromagnet may be electrified to form magnetic fields so as to grind the surface of the to-be-ground workpiece.

In practical use, a tool track of the grinding head may be acquired or planned, the electromagnet voltage of each coordinate point on the tool track may be computed according to the tool track of the grinding head, and the direct current voltage output by the programmable direct current power supply may be adjusted in real time by using the PWM control method according to the tool track during the grinding, so as to grind the to-be-ground workpiece; or after the electromagnet voltages of all the coordinate points on the surface of the to-be-ground workpiece are computed, the direct current voltage output by the programmable direct current power supply may be adjusted in real time by using the PWM control method according to the tool track during grinding, so as to grind the to-be-ground workpiece.

Figure 3:
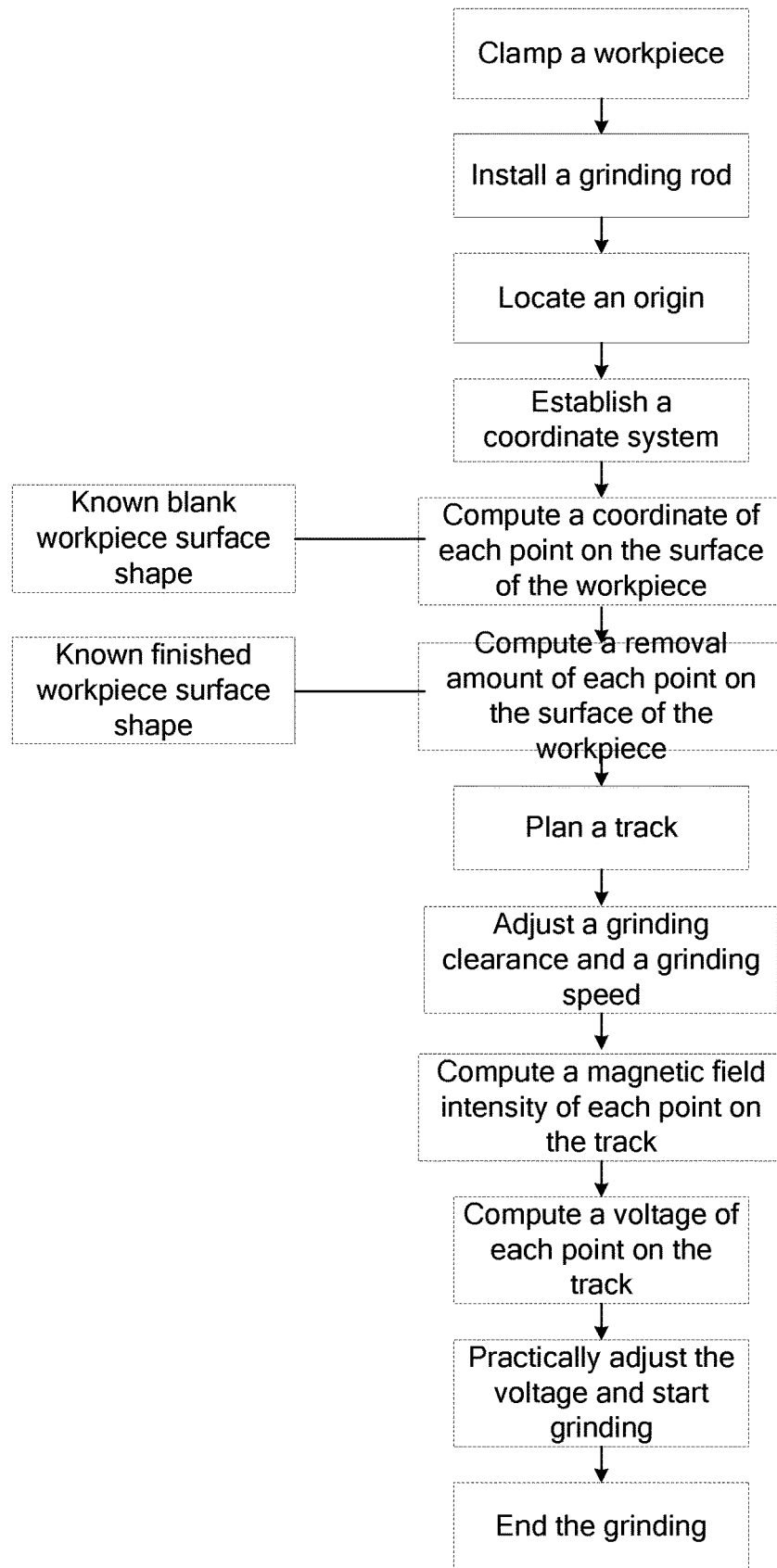
FIG. 3 is a flow diagram of a magnetic field-adaptive grinding method of the embodiment of the present disclosure.

The embodiment further provides a magnetic field-adaptive magnetic grinding method applied to the magnetic grinding device, and refer to FIG. 3, when a plane workpiece is ground, the method includes:

clamp the workpiece: place the plane workpiece on a grinding piece fixing table formed by a plate pole and a baffle, and clamp and fix the plane workpiece by using screws around;

install a grinding rod: install a permanent magnet grinding rod on a five-axis machine tool;

locate an origin: make a pointed cone-shaped grinding head to be vertical to and close to a certain point which is 1 mm close to the surface of the plane workpiece, and determine the point as the origin;

establish a coordinate system: select an X axis and a Y axis from an XY plane based on a convenient machining principle to establish a Cartesian coordinate system through the origin determined in the last step by taking a direction parallel to the permanent magnet grinding rod and far away from the permanent magnet grinding rod as a positive direction of a Z axis and taking a plane vertical to the Z axis and including the origin as the XY plane;

measure or acquire data of a known blank workpiece surface shape of the plane workpiece, and substitute the data of the blank workpiece surface shape into the coordinate system established in the last step to compute a coordinate of each point on the surface of the plane workpiece;

acquire data of a known ideal finished workpiece surface shape, namely, a magnetically ground plane workpiece surface shape, and compare the data of the blank workpiece surface shape with the data of the ideal finished workpiece surface shape to compute a removal amount Φ of each coordinate point (each point) on the surface of the plane workpiece, wherein the step is a common technology in numerical control machining programming; and intervals between the coordinate points are more than 1 mm;

acquire or plan a tool track of the grinding head;

adjust a grinding clearance to be 1 mm and adjust a grinding speed to be 300 r/min, wherein the grinding clearance is a distance between the pointed cone-shaped grinding head and the surface of the plane workpiece; and the grinding speed is a rotational angular velocity of a grinding shaft motor;

compute a magnetic field intensity of each point on the tool track, including: compute a grinding pressure of each point on the tool track according to a formula $$P = \frac{\phi}{Kvt},$$

wherein Φ represents a removal amount of any point; K represents a constant coefficient; P represents the grinding pressure; v represents a linear velocity of the grinding head; and t represents a grinding time;

compute a magnetic field intensity H of each point on the tool track according to a formula P=K1H, wherein K1 represents a constant value, and the grinding pressure is in direct proportion to the magnetic field intensity H;

compute an electromagnet voltage of each point on the tool track according to a formula E=H*Le*R/N, wherein E represents the electromagnet voltage; H represents the magnetic field intensity; N represents turns of an excitation coil of the electromagnet; Le represents an effective length of a magnetic path of the electromagnet; and R represents an impedance of the coil;

start the five-axis machine tool for grinding, acquire the electromagnet voltage of each point on the tool track, and adjust a direct current voltage output by a programmable direct current power supply (direct current voltage source) in real time by using a PWM technology according to the tool track, wherein the direct current voltage output by the programmable direct current power supply is equal to the electromagnetic voltage;

and end the grinding after grinding all the coordinate points on the surface of the plane workpiece.

For different coordinate points on the surface of the plane workpiece, the voltage of the electromagnet may be adjusted in real time through adjusting an output voltage of a PWM direct current power supply according to the computed removal amount required by each coordinate point and the computed electromagnetic voltage corresponding to each coordinate point; and through changing the magnetic field intensity in real time and fixing a grinding speed and a residence time of the permanent magnet grinding rod, the grinding precision may be greatly improved, the process complexity may be reduced, and convenience and reliability may be provided. Therefore, the magnetic field-adaptive magnetic grinding control method may be suitable for magnetic grinding of surface shapes of plane workpieces and free surface workpieces, and wide in use.

Each embodiment of the present specification is described in a progressive manner, each embodiment focuses on the difference from other embodiments, and the same and similar parts between the embodiments may refer to each other. Since the system disclosed in the embodiments corresponds to the method disclosed in the embodiments, the description is relatively simple, and reference can be made to the method description.

In this specification, several specific embodiments are used for illustration of the principles and implementations of the present disclosure. The description of the foregoing embodiments is used to help illustrate the method of the present disclosure and the core ideas thereof. In addition, those of ordinary skill in the art can make various modifications in terms of specific implementations and the scope of application in accordance with the ideas of the present disclosure. In conclusion, the content of this specification shall not be construed as a limitation to the present disclosure.

What is claimed is:

1. A magnetic grinding device, comprising: an electromagnet, a base, a grinding piece fixing table, a programmable power supply, a machine tool, a permanent magnet grinding rod, a controller and a grinding medium, wherein, one end of the electromagnet is arranged on the base;

a magnet platform of the grinding piece fixing table is connected with the other end of the electromagnet; and the grinding piece fixing table is used for fixing a to-be-ground workpiece;

the grinding medium covers a to-be-ground workpiece;

the magnet platform is a plate pole which is used for gathering magnetic fields formed by the electromagnet after electrification on the upper surface of the plate pole, and distributing the magnetic fields uniformly;

an output end of the programmable power supply is connected with a coil of the electromagnet; and the programmable power supply is used for supplying power for the electromagnet;

the permanent magnet grinding rod is arranged on the machine tool and located above the to-be-ground workpiece;

the machine tool is used for controlling the permanent magnet grinding rod to magnetically grind the surface of the to-be-ground workpiece;

and the controller is connected with the programmable power supply and the machine tool, separately, and the controller is used for acquiring grinding points, on the to-be-ground workpiece, of the permanent magnet grinding rod through the machine tool, and controlling an output voltage of the programmable power supply by utilizing a removal amount of a blank workpiece surface shape of the to-be-ground workpiece, the grinding points and a pulse width modulation (PWM) control method, so as to magnetically grind the to-be-ground workpiece, specifically comprising:

establishing a Cartesian coordinate system by taking a projection point, on the surface of the to-be-ground workpiece, of a grinding head of the permanent magnet grinding rod as an origin 0, wherein a Z axis of the Cartesian coordinate system is parallel to the permanent magnet grinding rod, and an XOY plane formed by an X axis and a Y axis of the Cartesian coordinate system is parallel to the surface of the to-be-ground workpiece; and comparing the blank workpiece surface shape with a finished workpiece surface shape and determining a removal amount of each coordinate point on the surface of the to-be-ground workpiece by utilizing the Cartesian coordinate system;

computing a grinding pressure of the coordinate point by utilizing the removal amount of the coordinate point according to a formula $$P = \frac{\phi}{Kvt},$$

wherein p represents the grinding pressure; Φ represents the removal amount; K represents a constant coefficient; v represents a linear velocity of the grinding head; and t represents a grinding time computing a magnetic field intensity of the coordinate point by utilizing the grinding pressure of the coordinate point according to a formula P=K1H, wherein P represents the grinding pressure; K1 represents a constant; and H represents the magnetic field intensity;

computing an electromagnet voltage of each point on the surface of the to-be-ground workpiece according to a formula $$E = \frac{H*Le*R}{N},$$

wherein E represents the electromagnet voltage; H represents the magnetic field intensity; Le represents an effective length of a magnetic path of the electromagnet; R represents the an impedance of the coil of the electromagnet; and N represents the turns of the coil of the electromagnet;

and starting the machine tool to acquire grinding points, at the blank workpiece surface shape, of the current permanent magnet grinding rod and electromagnet voltages of the grinding points, controlling an output voltage, at the grinding points, of the programmable power supply by utilizing the electromagnet voltages of the grinding points and the pulse width modulation (PWM) control method such that the electromagnet is electrified to form magnetic fields; and adsorbing, by the grinding points, magnetic grinding powder to form a magnetic grinding head so as to grind the surface of the to-be-ground workpiece.

2. The magnetic grinding device according to claim 1, wherein the grinding piece fixing table specifically comprises: the magnet platform, a baffle and screws;

the magnetism of the magnetic platform is opposite to that of the grinding head of the permanent magnet grinding rod;

the baffle is fixed on the magnet platform such that a container is formed by the grinding piece fixing table; and the screws run through the baffle and are used for fixing the to-be-ground workpiece.

3. The magnetic grinding device according to claim 1, wherein the controller is configured to perform operations comprising:

acquiring the blank workpiece surface shape of the to-be-ground workpiece and the finished workpiece surface shape of the to-be-ground workpiece;

determining a removal amount of each point on the surface of the to-be-ground workpiece by utilizing the blank workpiece surface shape and the finished workpiece surface shape;

computing a grinding pressure of each point on the surface of the to-be-ground workpiece by utilizing the removal amount;

computing a magnetic field intensity of each point on the surface of the to-be-ground workpiece by utilizing the grinding pressure;

computing an electromagnet voltage of each point on the surface of the to-be-ground workpiece by utilizing the magnetic field intensity and turns of the coil of the electromagnet; and controlling an output voltage of the programmable power supply by utilizing electromagnet voltages corresponding to the grinding points, on the to-be-ground workpiece, of the permanent magnet grinding rod and the pulse width modulation (PWM) method, so as to magnetically grind the to-be-ground workpiece.

4. A magnetic grinding control method applied to the magnetic grinding device according to claim 1, comprising:

acquiring the blank workpiece surface shape of the to-be-ground workpiece and the finished workpiece surface shape of the to-be-ground workpiece; and determining the removal amount of each point on the surface of the to-be-ground workpiece by utilizing the blank workpiece surface shape and the finished workpiece surface shape; wherein the step of determining the removal amount of each point on the surface of the to-be-ground workpiece by utilizing the blank workpiece surface shape and the finished workpiece surface shape specifically comprising:

establishing the Cartesian coordinate system by taking the projection point, on the surface of the to-be-ground workpiece, of the grinding head of the permanent magnet grinding rod as the origin 0, wherein the Z axis of the Cartesian coordinate system is parallel to the permanent magnet grinding rod, and the XOY plane formed by the X axis and the Y axis of the Cartesian coordinate system is parallel to the surface of the to-be-ground workpiece;

comparing the blank workpiece surface shape with the finished workpiece surface shape, and determining the removal amount of each coordinate point on the surface of the to-be-ground workpiece by utilizing the Cartesian coordinate system;

computing the grinding pressure of each point on the surface of the to-be-ground workpiece by utilizing the removal amount;

the step of computing the grinding pressure of each point on the surface of the to-be-ground workpiece by utilizing the removal amount specifically comprising:

computing the grinding pressure of each point on the surface of the to-be-ground workpiece according to the formula $$P = \frac{\phi}{Kvt};$$

wherein p represents the grinding pressure; Φ represents the removal amount; K represents the constant coefficient; v represents the linear velocity of the grinding head; and t represents the grinding time;

computing the magnetic field intensity of each point on the surface of the to-be-ground workpiece by utilizing the grinding pressure;

the step of computing the magnetic field intensity of each point on the surface of the to-be-ground workpiece by utilizing the grinding pressure specifically comprising:

computing the magnetic field intensity of each point on the surface of the to-be-ground workpiece according to the formula P=K1H;

wherein P represents the grinding pressure; K1 represents a constant; and H represents the magnetic field intensity;

computing the electromagnet voltage of each point on the surface of the to-be-ground workpiece by utilizing the magnetic field intensity and the turns of the coil of the electromagnet;

the step of computing the electromagnet voltage of each point on the surface of the to-be-ground workpiece by utilizing the magnetic field intensity and the turns of the coil of the electromagnet specifically comprising:

computing the electromagnet voltage of each point on the surface of the to-be-ground workpiece according to the formula $$E = \frac{H*Le*R}{N};$$

wherein E represents the electromagnet voltage; H represents the magnetic field intensity; Le represents the effective length of the magnetic path of the electromagnet; R represents the impedance of the coil of the electromagnet; and N represents the turns of the coil of the electromagnet;

controlling the output voltage of the programmable power supply by utilizing the electromagnet voltages corresponding to the grinding points, on the to-be-ground workpiece, of the permanent magnet grinding rod and the pulse width modulation (PWM) control method, so as to magnetically grind the to-be-ground workpiece;

and gathering, by a plate pole, magnetic fields, formed by the electromagnet after electrification, on the upper surface of the plate pole, and distributing the magnetic fields uniformly.

5. The magnetic grinding control method according to claim 4, before computing the grinding pressure of each point on the surface of the to-be-ground workpiece by utilizing the removal amount, further comprising:

adjusting a grinding clearance and a grinding speed.

6. The magnetic grinding control method according to claim 4, wherein the grinding piece fixing table specifically comprises: the magnet platform, a baffle and screws;

the magnetism of the magnetic platform is opposite to that of the grinding head of the permanent magnet grinding rod;

the baffle is fixed on the magnet platform such that a container is formed by the grinding piece fixing table;

and the screws run through the baffle and are used for fixing the to-be-ground workpiece.

7. The magnetic grinding control method according to claim 4, wherein the controller is configured to perform operations comprising:

acquiring the blank workpiece surface shape of the to-be-ground workpiece and the finished workpiece surface shape of the to-be-ground workpiece;

determining a removal amount of each point on the surface of the to-be-ground workpiece by utilizing the blank workpiece surface shape and the finished workpiece surface shape;

computing a grinding pressure of each point on the surface of the to-be-ground workpiece by utilizing the removal amount;

computing a magnetic field intensity of each point on the surface of the to-be-ground workpiece by utilizing the grinding pressure;

computing an electromagnet voltage of each point on the surface of the to-be-ground workpiece by utilizing the magnetic field intensity and turns of the coil of the electromagnet; and controlling an output voltage of the programmable power supply by utilizing electromagnet voltages corresponding to the grinding points, on the to-be-ground workpiece, of the permanent magnet grinding rod and the pulse width modulation (PWM) method, so as to magnetically grind the to-be-ground workpiece.

8. The magnetic grinding control method according to claim 6, before computing the grinding pressure of each point on the surface of the to-be-ground workpiece by utilizing the removal amount, further comprising:

adjusting a grinding clearance and a grinding speed.

9. The magnetic grinding control method according to claim 7 before computing the grinding pressure of each point on the surface of the to-be-ground workpiece by utilizing the removal amount, further comprising:

adjusting a grinding clearance and a grinding speed.

\* \* \* \* \*